(12) United States Patent  
Falk, Jr.

(10) Patent No.: US 8,344,271 B1
(45) Date of Patent: Jan. 1, 2013

(54) LUGGAGE HAVING A BUILT-IN SCALE CONFIGURED TO SLIDE INTO AND OUT OF THE LUGGAGE BASE, WHERE THE SCALE CAN MEASURE WEIGHT IN EITHER CONFIGURATION

(76) Inventor: David C. Falk, Jr., Raleigh, NC (US)

(*) Notice: Subject to any disclaimer, the term of this patent is extended or adjusted under 35 U.S.C. 154(b) by 726 days.

(21) Appl. No.: 12/546,310

(22) Filed: Aug. 24, 2009

(51) Int. Cl.
*G01G 19/52* (2006.01)
*G01G 19/58* (2006.01)

(52) U.S. Cl. ........ 177/126; 190/122; 190/123; 177/127; 177/131; 177/245

(58) Field of Classification Search ........... 177/126, 177/127, 131, 142–144, 148, 149, 245; 190/122, 190/123
See application file for complete search history.

(56) References Cited

U.S. PATENT DOCUMENTS

| | | | |
|---|---|---|---|
| 6,371,584 B1* | 4/2002 | Alreck | 312/235.1 |
| 6,781,067 B2* | 8/2004 | Montagnino et al. | 177/25.13 |
| 6,802,578 B1* | 10/2004 | Lang et al. | 312/235.1 |
| 7,158,031 B2 | 1/2007 | Tuttle | |
| 7,232,961 B1 | 6/2007 | Godshaw et al. | |
| 7,265,302 B2 | 9/2007 | Keech et al. | |
| 7,281,615 B2 | 10/2007 | Siwak et al. | |
| 7,355,131 B2* | 4/2008 | Pathmanathan et al. | 177/144 |
| 7,358,449 B2 | 4/2008 | Hannon | |
| 7,378,604 B2 | 5/2008 | Truong | |
| 7,439,456 B2* | 10/2008 | Ogunnaike | 177/148 |
| 7,501,591 B1 | 3/2009 | Muniz et al. | |
| 7,521,638 B1 | 4/2009 | Godshaw et al. | |
| 7,692,107 B1* | 4/2010 | Shotey et al. | 177/131 |
| 2006/0207850 A1 | 9/2006 | Lewis | |
| 2007/0205025 A1 | 9/2007 | Taha | |

* cited by examiner

*Primary Examiner* — Randy W Gibson
(74) *Attorney, Agent, or Firm* — Coats & Bennett, PLLC

(57) ABSTRACT

An article of luggage includes a built-in scale that slides into and out of a base. When the scale is disposed within the base, the user can measure the weight of the luggage. When the scale is external to the base, the user can weigh him or herself.

20 Claims, 7 Drawing Sheets

LUGGAGE HAVING A BUILT-IN SCALE CONFIGURED TO SLIDE INTO AND OUT OF THE LUGGAGE BASE, WHERE THE SCALE CAN MEASURE WEIGHT IN EITHER CONFIGURATION

FIELD OF THE INVENTION

The present invention relates generally to articles of luggage, and particularly to articles of luggage having built-in scales.

BACKGROUND

People generally take their clothing and other items in one or more suitcases or trunks when traveling. In most cases, such luggage makes traveling easier for people, especially when flying on a commercial aircraft, for example. However, due to a variety of economic factors, most airlines impose a limit to the number of bags a traveler can place in the storage area of an aircraft. Further, each article of checked luggage is often subject to a strict weight limitation. There are usually stiff monetary penalties imposed on travelers whose luggage exceeds these limitations.

Unfortunately, many travelers do not weigh their luggage prior to going to the airport. Those that do are often limited in their ability to weigh their luggage accurately. Thus, all too often, a traveler is not aware of the true weight of an article of luggage until the traveler places the luggage on the scale at the check-in counter. If a bag exceeds the weight limitations, the traveler is forced to pay additional fees. If a traveler does not wish to pay the fee, then the traveler must redistribute the contents of the heavy bag to one or more other bags that are below the weight limit. This process is inconvenient and frustrating, and delays both the traveler and the airline employees. It also irritates the other travelers who are also checking in.

SUMMARY

The present invention provides an article of luggage, such as a suitcase, for example, having a built-in scale. The luggage comprises two main components—a frame and a case attached to the frame. The frame includes a base having wheels or casters and a pull-out handle. An integral scale is slidably mounted to the base so as to slide into and out of the base between a closed position and an open position. The scale comprises one or more sensor circuits or cells for measuring weight, and one or more digital displays for displaying the weight.

In one embodiment, the scale measures the weight of the luggage in the closed position. A first sensor circuit measures the weight of the luggage and provides the weight to a first display via a logic circuit when the scale is closed. In the open position, the scale functions as a floor scale to measure the weight of an external load such as a person. In some embodiments, the luggage may also include a memory to store the weight of the luggage, and a transmitter to transmit the stored weight to a corresponding receiver responsive to some predetermined event.

DETAILED DESCRIPTION

The present invention provides an article of luggage, such as a suitcase, for example. The luggage has a case to contain a person's belongings, such as clothing or other items, and a support frame to support the case. The luggage also includes a low-profile, but sturdy, built-in scale. An airline traveler, for example, can selectively place the luggage into different configurations to determine the weight of the luggage, and the weight of the airline traveler, independently of each other.

More particularly, the built-in scale slidingly mounts to a base attached to the frame such that it slides in and out of the base between a closed position and an open position, respectively. In the closed position, the scale is disposed within the base and accurately weighs the contents of the luggage. In the open position, the scale extends out of the base and functions as a floor scale so that a traveler or other person can step onto the scale to measure their weight.

Figure 1:
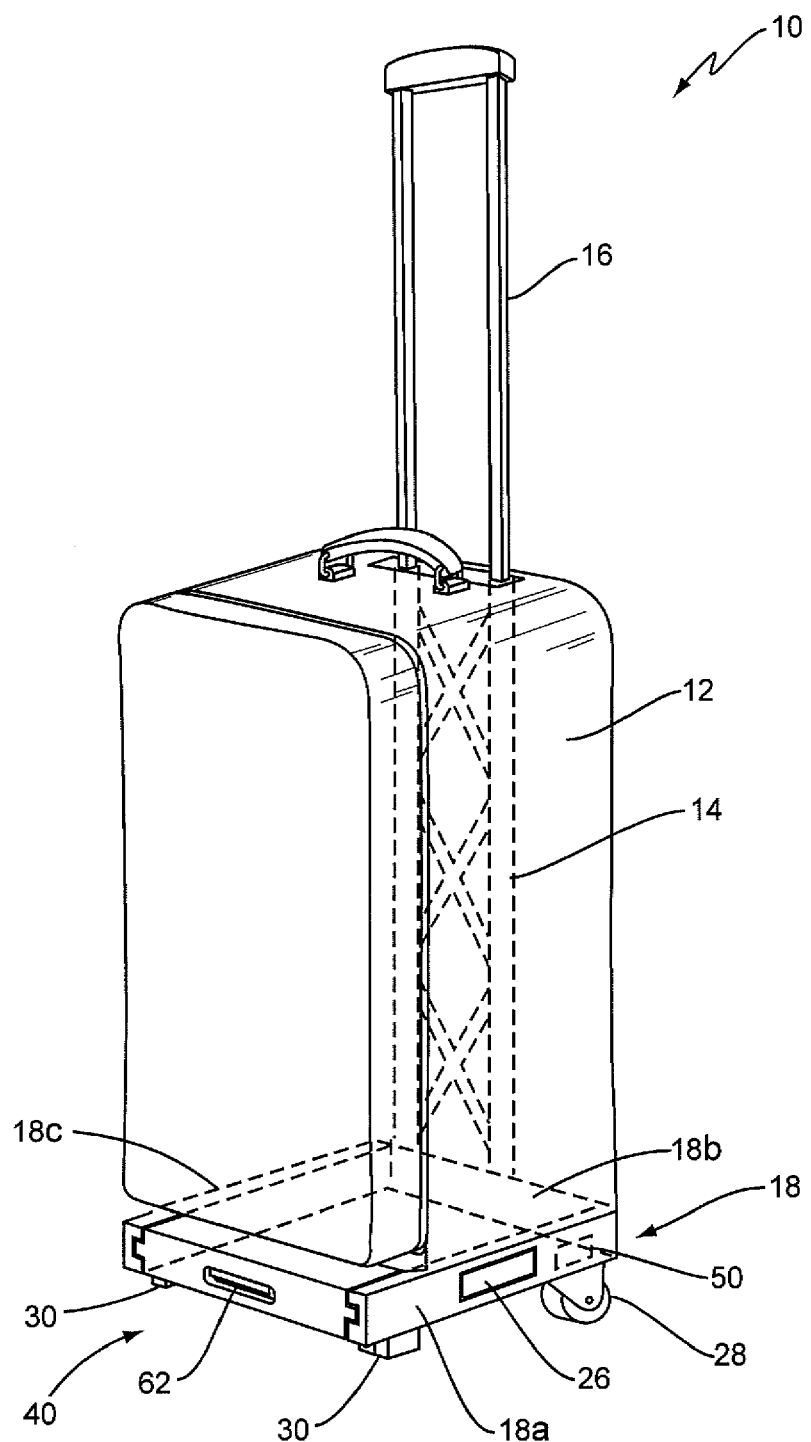
FIGS. 1-2 are perspective views of an article of luggage configured according to one embodiment of the present invention.
Figure 2:
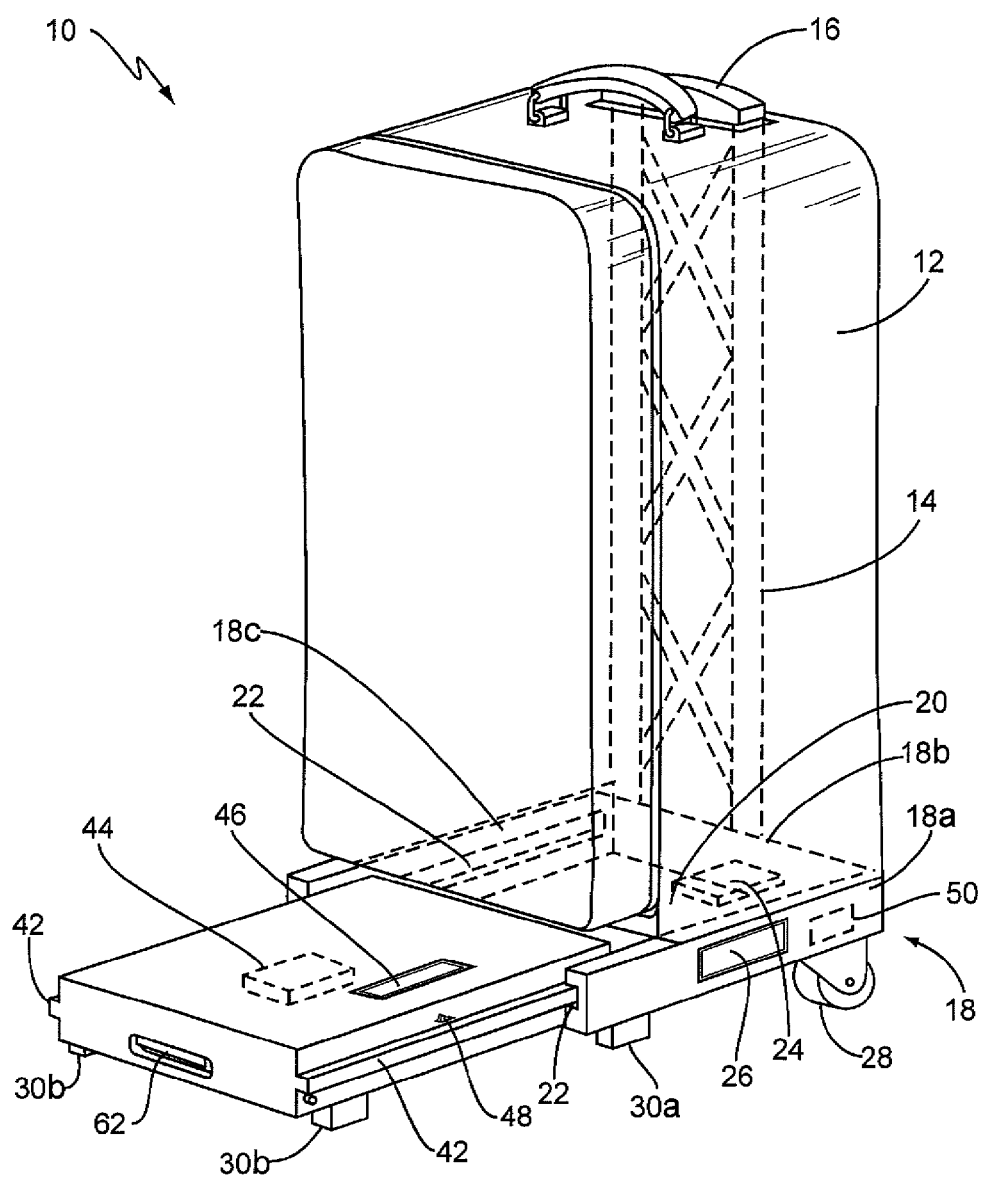

FIGS. 1 and 2 illustrate an article of luggage configured according to one embodiment of the present invention. As seen in the figures, and as described in the specification, the article of luggage is depicted as a suitcase generally indicated using the reference number 10. This, however, is for illustrative purposes only. Those skilled in the art will fully appreciate that the claimed invention is also suitable for use in other types of luggage, such as trunks.

Suitcase 10 comprises a case 12 connected to a support frame 14, and a telescoping handle 16. The case 12 may be constructed of a material such as cloth, leather, vinyl, or plastic, for example, and thus, may be flexible or rigid. The case 12 may be any size desired, but is generally sized to contain the belongings of a person such as clothing and/or other items. Zippers, buckles, or other mechanical fasteners (not shown) may be used on case 12 to allow a user to open and close the case 12 to gain access into the interior of case 12.

The support frame 14 comprises a lightweight but rigid structure that is attached to the case 12. Frame 14 may be fixedly attached to case 12, or removably attached to case 12, but generally provides support for case 12. The frame 12 stabilizes case 12 allowing the user to orient the suitcase 10 in an upright position, and/or to roll the suitcase 10 along a flat, smooth surface on casters or wheels 28. As is known in the art, handle 16 is configured to telescope into and out of the frame 14 to facilitate such movement.

The support frame 14 includes a rigid base 18 having sidewalls 18a-18c. The sidewalls 18a-18c may be constructed of a material such as wood, plastic, or other hard material, for example, to support the case 12 on at least three sides. The sidewalls 18a-18c also form an interior cavity 20 that, according to one embodiment of the present invention, is sized and shaped to receive and hold a scale 40. Particularly, the scale 40 slides into and out of the cavity 20 formed in base 18 between a closed position (FIG. 1) and an open position (FIG. 2). In the closed position, the scale 40 is used to accurately weigh suitcase 10. In the open position, the scale 40 may be used to accurately weigh the user, for example.

With the present invention, the scale 40 is built into the base 18, and therefore, is integral with the base 18 and suitcase 10. The scale 40 may be integrated into the base 18 in any manner known in the art; however, in one embodiment, the interiors of the opposing sidewalls 18a, 18c are formed to include elongated slots 22. The slots 22 are sized and shaped to receive the elongated rails 42 formed on the exterior sides of scale 40. To place the scale into the open and closed positions, the user pushes or pulls the scale 40 into and out of cavity 20 such that the rails 42 slide along slots 22.

According to the present invention, the user may configure the suitcase 10 to utilize the scale 40 to weigh both the suitcase 10, and the user, independently of each other. Particularly, the present invention provides a pair of sensor circuits 24, 44 disposed in the base 18 and scale 40, respectively. As described later in more detail, the sensor circuits 24, 44 measure the weight of either the suitcase 10, or the user, depending on whether scale 40 is in the open or closed position, and output corresponding electrical signals to a logic circuit 50, which may be disposed in the base 18. The logic circuit 50 then translates the received signals to an alpha-numeric representation for output to a corresponding one of the display units 26 or 46.

The base 18 also includes a pair of casters or wheels 28, and a pair of support pegs 30 attached to the bottom of base 18. The wheels 28 roll freely to facilitate the user pulling the suitcase 10 along a flat, smooth surface by the handle 16. However, both the wheels 28 and the pegs 30 function to stabilize the suitcase 10 when it is in the upright position. As seen in FIG. 1, the wheels 28 and the pegs 30 are under the base 18 proximate the periphery of base 18. This helps to stabilize the suitcase 10 when the scale 40 is in the closed position, thereby helping the sensor circuit 24 to achieve an accurate reading of the weight of suitcase 10. When the user slides the scale 40 to the open position, however, the support pegs 30 split into multiple parts—30a, 30b. As seen in FIG. 2, a first part 30a remains attached to the bottom of the sidewalls 18a, 18c to stabilize the base 18. A second part 30b, however, moves with the scale 40 out of the base 18 to stabilize the scale 40 while in the open position.

As previously stated, the present invention uses sensor circuits 24, 44 to measure weight. The sensor circuits 24, 44 may comprise any of a variety of well-known devices, but in one embodiment, each sensor circuit 24, 44 comprises a load cell. Load cells generally comprise one or more strain gauges. Each strain gauge typically includes a metallic foil pattern that is deformed whenever the strain gauge is subject to a force or pressure, such as the weight of the suitcase or person. The deformation alters the electrical resistance of the metallic foil pattern, which the strain gauge converts into electrical signals. The electrical signals, which may be amplified, are then used in an algorithm that calculates the weight of the suitcase 10, or of an external load, (e.g., the traveler) based on whether the scale 40 is in the closed position or the open position. Signals representing the calculated weight are then output to the logic circuit 50 for display on one of the displays 26, 46. Thus, when the scale 40 is in the closed position, sensor circuit 24 determines the weight of the suitcase 10 for display on display 26. Similarly, when the scale 40 is in the open position, sensor circuit 44 determines the weight of the user or other object placed on the scale 40 for display on display 46.

Figure 3:
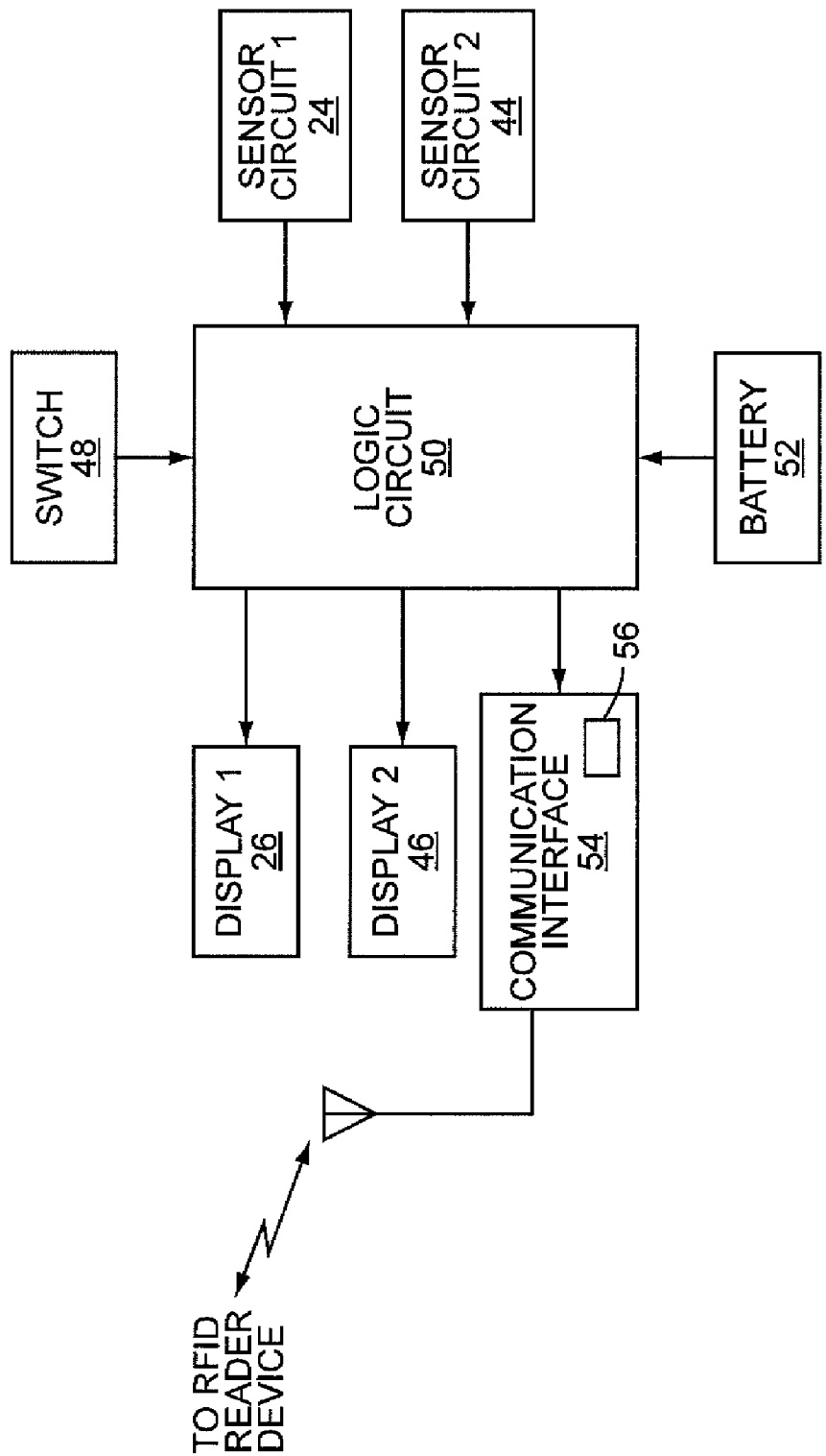
FIG. 3 is a block diagram illustrating some electronic components and circuits that may be used according to one embodiment of the present invention.

The present invention can use any method or device to determine whether the scale 40 is in the closed position or the open positions. However, in the embodiment seen in FIGS. 2-3, the present invention employs a spring-loaded rocker switch 48 and the logic circuit 50 to determine the position of the scale 40. Particularly, the switch 48 is disposed on one of the rails 42 (FIG. 2). The switch 48, both sensor circuits 24, 44, and both displays 26, 46 electrically connect to the logic circuit 50 (FIG. 3), which may be, for example, a microprocessor. A battery 52 or other power source may be used to provide power to the logic circuit 50 and/or any of the other components. As the scale 40 slides into the cavity 20 of base 18, the interior surface of slot 22 pushes the switch 48 into the rail 22 to place the switch 48 in a first state. In this first state, the switch 48 causes the logic circuit 50 to accept the input from the first sensor circuit 24 and translate those signals into an alpha-numeric representation of the weight of suitcase 10. The logic circuit 50 then outputs the alpha-numeric representation of the suitcase weight to display 26. Similarly, when the user slides the scale 40 out of the base 18, the spring-loaded switch 48 is automatically biased into a second state. In this second state, the switch 48 causes the logic circuit 50 to accept the input from the second sensor circuit 44 and translate the received signals into an alpha-numeric representation of the weight of the external load. The logic circuit 50 then outputs the alpha-numeric representation of the suitcase weight to display 46.

In addition, the present invention may also employ, in some embodiments, a communication interface 54 to communicate the weight of the suitcase 10 to a corresponding receiver (not shown). Such an interface may be useful, for example, in airports or other places that use Radio Frequency Identification (RFID) readers. In this embodiment, the communication interface 54 comprises a Radio Frequency Identification (RFID) device that connects to the logic circuit 50. The communication interface 54 includes a memory 56 to store the weight of the suitcase 10. Particularly, when the scale 40 is in the closed position, the state of the switch 48 controls the logic circuit 50 to write the weight of the suitcase 10 in memory 56 in addition to sending it to the display 26. Then, when the user passes a corresponding remote RFID reader, such as those installed at an airline terminal, for example, the communication interface 54 is triggered to read the weight from memory 56 and send it to the requesting RFID reader.

Figure 4:
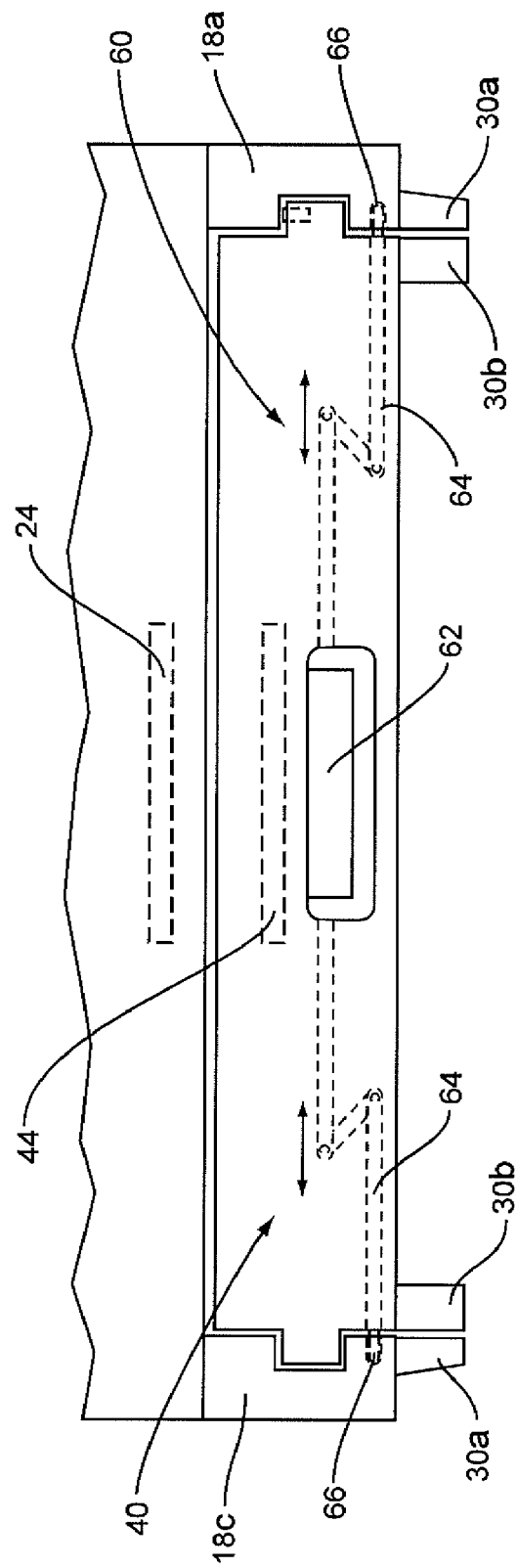
FIG. 4 is a perspective view of a locking mechanism used in one embodiment of the present invention.

FIG. 4 illustrates a locking mechanism 60 that prevents the scale 40 from inadvertently sliding from the closed position to the open position. The locking mechanism 60 comprises a release handle 62 connected to a pair of articulating linkages 64. A locking pin 66 is disposed at the terminal end of each linkage 64. Normally, the linkages 64 are outwardly biased, which causes the locking pins 66 to be inserted into corresponding holes formed in the sidewalls 18a, 18c. In these holes, the locking pins 66 prevent the scale 40 from sliding out of the base 18 during transit. To unlock the scale 40, the user operates the handle release 62 such that the linkages 64 retract the locking pins 66 from the sidewalls 18a, 18c. So retracted, the user can then slide the scale 40 out of base 18 as previously described.

Figure 5:
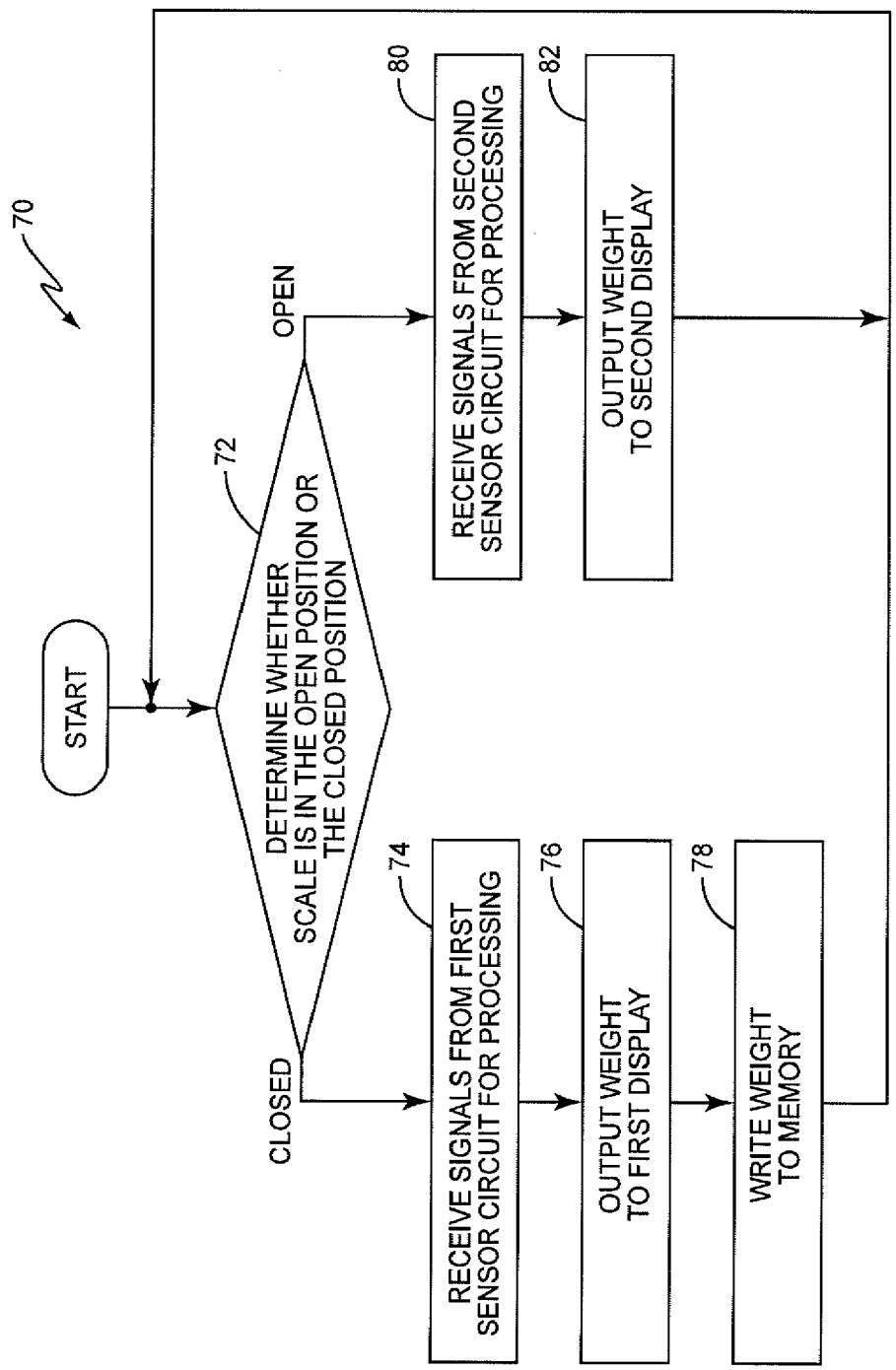
FIG. 5 is a flow chart illustrating a method of using the built-in scale to measure the weights of the article of luggage, and an external load, according to one embodiment f the present invention.

FIG. 5 illustrates a method 70 of configuring suitcase 10 such that the user can selectively weigh either the suitcase 10, or the user. Method 70 begins with the logic circuit 50 determining whether the scale 40 is in the closed position within the base 18, or the open position out of the base 18 (box 72). As described above, the determination may be based on the state of switch 48. If the logic circuit 50 determines that the scale 40 is in the closed position, the logic circuit 50 receives signals from the first sensor circuit 24 (box 74) and routes them to the first display 26 disposed on the side of base 18 (box 76). In addition, logic circuit 50 may also write the measured weight to memory 56 associated with the communication interface 54 (box 78). As previously described, the communication interface 54 may read this weight from the memory 56 responsive to a predetermined event (e.g., detecting a corresponding remote receiver) and transmit the weight to the receiver automatically without input from the user. If the logic circuit 50 determines that the scale 40 is in the open position (box 72), the logic circuit 50 receives signals from the second sensor circuit 24 (box 80) and routes them to the first display 26 disposed on the side of base 18 (box 82).

Figure 6:
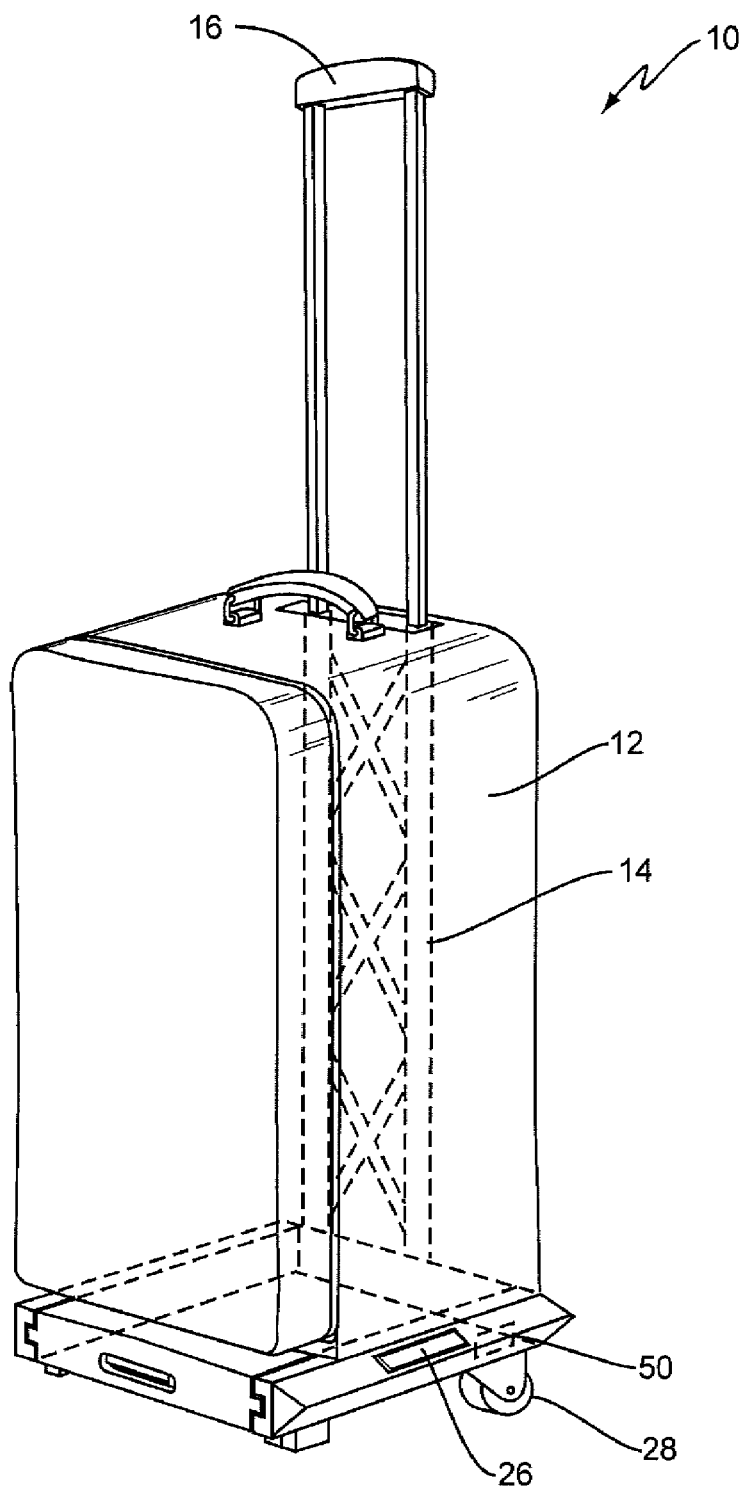
FIGS. 6-7 are perspective views illustrating an article of luggage configured according to another embodiment of the present invention.
Figure 7:
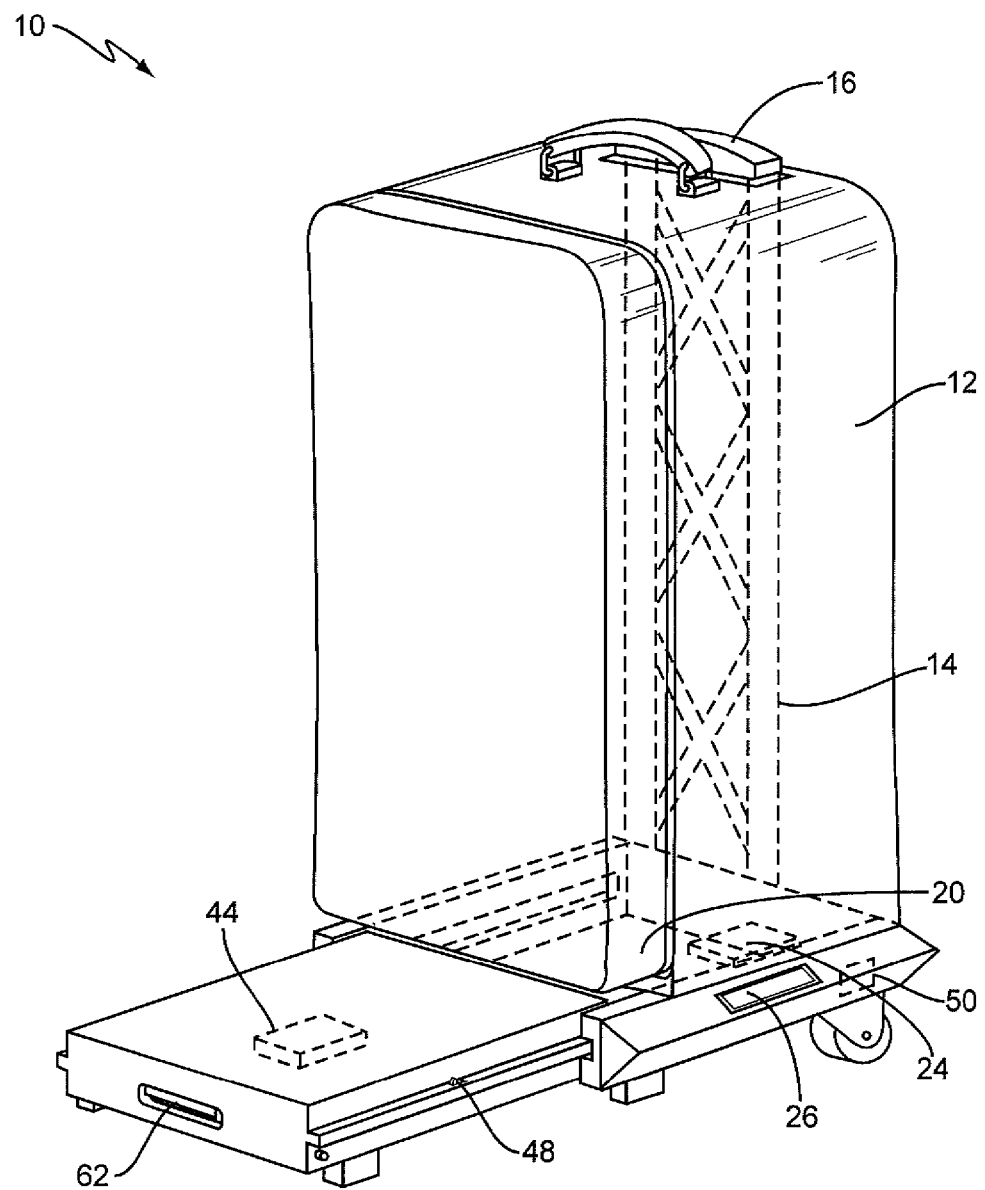

The present invention may, of course, be carried out in other ways than those specifically set forth herein without departing from essential characteristics of the invention. For example, the previous embodiments illustrate the present invention as having 2 different displays—one display dedicated to each sensor circuit. FIGS. 6 and 7, however, illustrate another embodiment in which the present invention uses only a single display 26. As seen in FIGS. 6 and 7, the base 18 is formed to include an extension 84 on one sidewall. The display 26, as well as the logic circuit 50, is disposed on the sidewall of base 18. The extension 84 may be angled such that the display 26 faces upwardly. This allows the user to easily read a measured weight simply by looking down. As in the previous embodiments, the logic circuit 50 determines whether the scale 40 is in the closed position (FIG. 6) or the open position (FIG. 7), and receives signals from the first and second sensor circuits 24, 44, accordingly. In this embodiment, however, the logic circuit would be configured to simply output the signals from both sensor circuits 24, 44 to the single display 26.

Other modifications are also possible. For example, the present invention need not employ strain gauges and load cells as sensor circuits, but rather, can employ any of a variety of sensors known in the art. Additionally, articulating linkages and locking pins are not the only means by which to lock the scale 40 within the base. Any well-known locking mechanism will sufficiently prevent the scale 40 from inadvertently sliding open. Further, the suitcase 10 appears substantially rectangular, thus, the scale 40 is substantially rectangular. It should be noted that the present invention is not so limited, and the scale 40 can be any size or shape so long as it fits into a corresponding cavity 20 formed within base 18. Therefore, the present embodiments are to be considered in all respects as illustrative and not restrictive, and all changes coming within the meaning and equivalency range of the appended claims are intended to be embraced therein.

What is claimed is:

1. An article of luggage comprising:
   a case;
   a frame attached to the case and comprising a supporting base; and
   a scale built into the base, and configured to slide between a closed position, wherein the scale is retracted into the base, and an open position, wherein the scale extends out of the base, the scale being configured to measure a weight of the luggage when the scale is in the closed position.

2. The luggage of claim 1 further comprising a first sensor to measure the weight of the luggage when the scale is in the closed position, and a second sensor to measure a weight of a load external to the luggage when the scale is in the open position.

3. The luggage of claim 2 further comprising a logic circuit configured to:
   detect when the scale slides between the open and closed positions;
   output the measured weight of either the luggage or the external load based on whether the scale is in the open position or the closed position.

4. The luggage of claim 2 further comprising one or more displays to display the weights measured by the first and second sensors.

5. The luggage of claim 4 further comprising a first display to display the measured weight of the luggage when the scale is in the closed position, and a second display to display the measured weight of the external load when the scale is in the open position.

6. The luggage of claim 1 wherein the base further comprises a locking mechanism to lock the scale in the closed position.

7. The luggage of claim 6 wherein the base further comprises a handle to unlock the locking mechanism to allow the scale to slide to the open position.

8. The luggage of claim 1 further comprising a pair of legs attached to an underside of the base to support the luggage above an underlying surface, each leg being configured to separate into two parts when the scale slides to the open position.

9. The luggage of claim 8 wherein a first part of each leg remains below the base when the scale slides to the open position, and a second part of each leg moves with the scale to support the scale in the open position.

10. The luggage of claim 1 wherein the scale is slidably mounted to the base and is configured to measure the weight of the luggage when the base is in the closed position, and a weight of a person when the base is in the open position.

11. The device of claim 1 further comprising a memory to store the measured weight of the luggage, and a communication interface to transmit the stored weight to a corresponding receiver.

12. A method for determining the weight of luggage, the method comprising:
   providing a frame for luggage with a base to support a case attached to the frame;
   slidably mounting a built-in scale to the base such that the scale slides between a closed position, wherein the scale is retracted into the base, and an open position, wherein the scale extends out of the base; and
   measuring a weight of the luggage when the built-in scale is in the closed position.

13. The method of claim 12 further comprising measuring a weight of a load external to the luggage when the built-in scale is in the open position.

14. The method of claim 13 further comprising detecting when the built-in scale slides between the open and closed positions.

15. The method of claim 13 further comprising receiving signals from one or more sensors representing the measured weight of either the luggage, or the external load, based on whether the built-in scale is in the open or closed position.

16. The method of claim 13 further comprising selectively displaying either the measured weight of the luggage, or the measured weight of the external load, based on whether the built-in scale is in the open or closed position.

17. The method of claim 12 further comprising locking the built-in scale in the closed position to measure the weight of the luggage, and unlocking the built-in scale to slide to the open position to measure the weight of the external load.

18. The method of claim 12 further comprising forming a pair of support legs on an underside of the base to support the luggage above an underlying surface when the built in scale is in the open and closed positions, each support leg comprising a first part and a second part.

19. The method of claim 18 further comprising separating the first and second parts of each support leg when the built-in scale slides to the open position such that the first part of each support leg remains under the base to support the luggage, and the second part of each support leg moves with the built-in scale to support the built-in scale above the underlying surface.

20. The method of claim 12 further comprising storing the measured weight of the luggage in a memory, and transmitting the stored weight to a corresponding receiver responsive to a predetermined event.

* * * * *